(12) United States Patent
Kuiper et al.

(10) Patent No.: US 7,570,434 B2
(45) Date of Patent: Aug. 4, 2009

(54) LIQUID-BASED OPTICAL DEVICE, METHOD FOR CONTROLLING SUCH A DEVICE AND ELECTRONIC DEVICE

(75) Inventors: Stein Kuiper, Vught (NL); Bernardus H. W. Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 53 days.

(21) Appl. No.: 11/572,641

(22) PCT Filed: Jul. 28, 2005

(86) PCT No.: PCT/IB2005/052541

§ 371 (c)(1),
(2), (4) Date: Jan. 25, 2007

(87) PCT Pub. No.: WO2006/013541

PCT Pub. Date: Feb. 9, 2006

(65) Prior Publication Data

US 2008/0095498 A1  Apr. 24, 2008

(30) Foreign Application Priority Data

Jul. 29, 2004  (GB)  ................... 0416885.2

(51) Int. Cl.
G02B 1/06  (2006.01)
(52) U.S. Cl. .......................... 359/666; 359/665
(58) Field of Classification Search .......... 359/665, 359/666
See application file for complete search history.

(56) References Cited

U.S. PATENT DOCUMENTS 6,369,954 B1  4/2002  Berge et al.

(Continued)

FOREIGN PATENT DOCUMENTS

WO  03069380 A1  8/2003
WO  03071335 A2  8/2003

(Continued)

OTHER PUBLICATIONS

Roques, Carmes T. et al: Liquid Behavior inside a Reflective Display Pixel Based on Electrowetting, Journal of Applied Physics, vol. 95, No. 8, Apr. 15, 2004, pp. 4389-4396, XP002329483.
Berge, B. et al: Variable Focal Lens Controlled by an External Voltage, An Application of Electrowetting, Physical Journal E Soft Matter, EDP Sciences, vol. 3, No. 2, Oct. 2000, pp. 159-163, XP002285977.
Pollack, Michael G. et al: Electrowetting-Based Actuation of Liquid Droplets for Microfluidic Applications, Applied Physics Letter, AIP, vol. 77, No. 11, Sep. 11, 2000, pp. 1725-1726, XP012026140.
Kuiper, S. et al: Variable-Focus Liquid Lens for Miniture Cameras, Applied Phusics Letters, AIP, vol. 85, No. 7, Aug. 16, 2004, pp. 1128-1130, XP001226648.

(Continued)

*Primary Examiner*—William C Choi

(57) ABSTRACT

The present invention discloses an optical device comprising a container having an inner wall, said container enclosing a first liquid (A) and an electrically susceptible second liquid (B), said liquids (A; B) being immiscible and being in contact with each other via an interface (14), said interface (14) having a contact angle with the inner wall; and an electrode arrangement (2; 12) for controlling the shape of the interface (14) by means of a voltage; the optical device having an operational range in between a first value of the contact angle and a second value of the contact angle, the first value being in a range of 50-110° and the second value being in a range of 70°-130°, the second value being larger than the first value. It has been discovered that the response speed of the interface (14) to a change in position is a function of the contact angle ($\theta$), with a response speed reaching a maximum value around ($\theta$)=90° and at least 75% of this maximum value in the given interval. Consequently, an optical device having advantageous response characteristics is obtained.

13 Claims, 3 Drawing Sheets

U.S. PATENT DOCUMENTS

Figure 1:
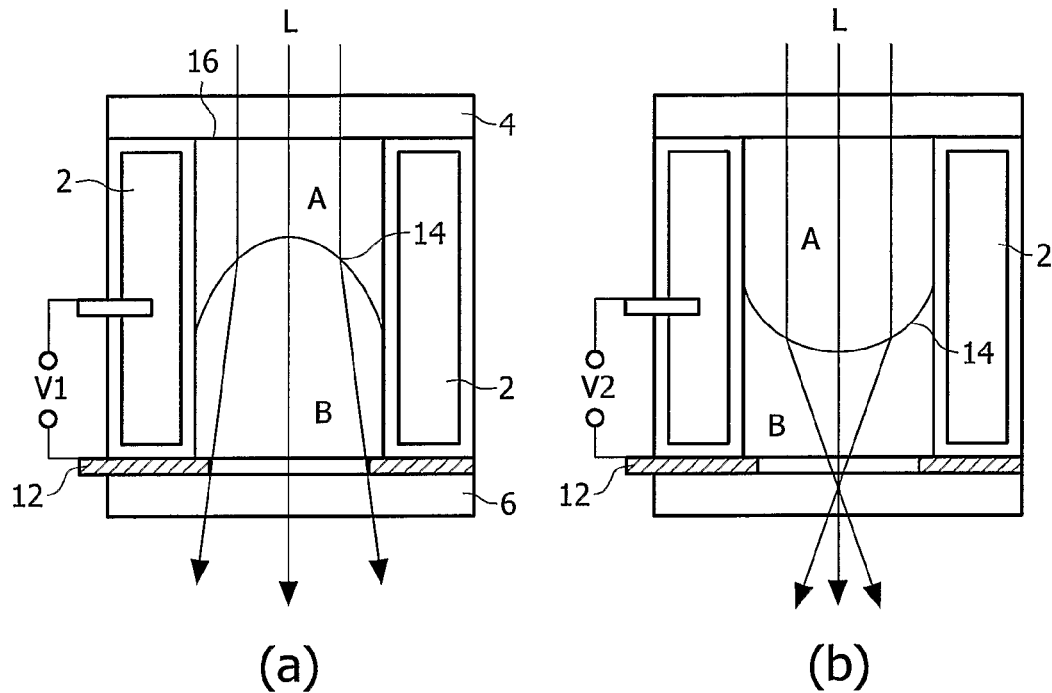

| | | |
|---|---|---|
| 6,702,483 B2 | 3/2004 | Tsuboi et al. |
| 2001/0017985 A1 | 8/2001 | Tsuboi et al. |
| 2002/0176148 A1 | 11/2002 | Onuki et al. |

FOREIGN PATENT DOCUMENTS

| | | |
|---|---|---|
| WO | 2004051323 A1 | 6/2004 |
| WO | 2004102252 A1 | 11/2004 |

OTHER PUBLICATIONS

Kuiper S. et al: Variable-Focus Liquid Lens for Portable Applications, Proceedings of the SPIE, vol. 5523, No. 1, Aug. 4, 2004, pp. 100-109, XP002330404.

LIQUID-BASED OPTICAL DEVICE, METHOD FOR CONTROLLING SUCH A DEVICE AND ELECTRONIC DEVICE

The present invention relates to an optical device comprising a container having an inner wall, said container enclosing a first liquid and an electrically susceptible second liquid, said liquids being immiscible and being in contact with each other via an interface, said interface having a contact angle with the inner wall; and an electrode arrangement for controlling the shape of the interface by means of a voltage.

The present invention further relates to a method for controlling such an optical device.

The present invention also relates to an electronic device comprising such an optical device.

Optical devices based on the manipulation of liquids are rapidly gaining large commercial interest, not in the least because of their lack of mechanically moving parts and the relative simplicity of the devices, which makes the devices cheap and durable.

International patent application WO03/069380 discloses a cylindrical variable focus lens incorporating two immiscible fluids having different refractive indices, one of the fluids being conductive and the other being insulating. These fluids preferably have a comparable density to avoid a gravitational dependency of the orientation of the liquids on the orientation of the lens. The shape of the interface between the two fluids is manipulated by applying a voltage across the lens, which can be used to introduce a change in the focal point of the lens. The walls of the cylinder and one of the transparent lids of the cylinder are coated with a hydrophobic coating to ensure that at least in a switched off state the conductive fluid, which typically is a polar liquid, does not wet said walls in order to maintain a well-defined interface between the fluids.

Although liquid-based optical devices show great potential, there are problems associated with such devices as well. One of the problems is that the response time of the interface, that is, the time it takes the interface to change from its initial position to a position governed by the applied voltage, can be quite long. This is especially unwanted in applications in which a user expects fast response times, such as in digital still cameras, mobile phones extended with camera functionality or dual-layer optical recording systems such as the Blu-Ray disc recorder.

The invention seeks to provide an optical device in which fast response times of the interface can be realized.

The invention also seeks to provide an electronic device comprising such an optical device.

The invention further seeks to provide a method for controlling such an optical device.

According to a first aspect of the invention, there is provided an optical device comprising a container having an inner wall, said container enclosing a first liquid and an electrically susceptible second liquid, said liquids being immiscible and being in contact with each other via an interface, said interface having a contact angle with the inner wall and an electrode arrangement for controlling the shape of the interface by means of a voltage; the optical device having an operational range in between a first value of the contact angle and a second value of the contact angle, the first value being in a range of 50-110° and the second value being in a range of 70°-130°, the second value being larger than the first value.

The invention is based on the realisation that the response time of the interface is a function of the contact angle between the interface and the inner wall of the container, with a response speed of at least 75% of the maximum value being achieved when the contact angle lies in the range of approximately 50°-130°.

Preferably, the operational range is centered around 90 degrees, because at this angle the switching speed is at its maximum value.

At this point, it is noted that in U.S. patent application US2001/0017985 an optical device is disclosed that incorporates two immiscible liquids with equal refractive indices but different transmittances, with one of the two liquids being conductive. By varying the boundary surface between these two liquids, the amount of each of the liquids in the light path through the device is changed and a diaphragm is obtained as a result. In this patent application, an embodiment is shown in which a contact angle θ between the boundary surface and an imaginary vertical axis is suggested to be optimal around 90° in order to achieve a reduction in the building height of the optical device. This is realized by slanting the contact walls of the container with respect to the optical axis of the optical device. However, it is emphasized that this patent application does not disclose a contact angle of around 90° between the liquid interface and the inner wall of the container nor does it disclose that such a contact angle would be advantageous for the switching speed of the optical device. Therefore, the present invention is both novel and inventive over US2001/0017985.

In an embodiment, at least one of the first liquid and the second liquid comprises a surface tension reducing compound, which may be a fluorinated organic compound such as trifluoroethanol or sodium trifluoroacetate. Since at 0 Volt the contact angle θ between the interface and the inner wall of the container obeys the relation:

$$\cos(\theta) = (\gamma_{L1/IW} - \gamma_{L2/IW})/\gamma_{L1/L2} \quad (1)$$

with γ defining the surface tensions between the various parts of the optical device as indicated by the indices L1 for the first liquid, L2 for the second liquid and IW for the inner wall of the container, the surface tension between one of the liquids and the inner wall can be reduced by the introduction of the appropriate surface-active component, thus forcing the contact angle between the interface and the inner wall towards 90°.

As an alternative to manipulating the various surface tensions inside the optical device, a contact angle in the desired range can also be achieved by applying a non-zero voltage to the optical device when the optical device is in an idle state, that is, before it is going to be used. To this end, the optical device further comprises driver circuitry for providing the electrode arrangement with a non-zero voltage during said idle state. Consequently, the surface tensions between the inner wall of the container and the first and/or second liquid can be kept large, which has the advantage that lower voltages are required to switch the contact angle to extreme values, i.e., values well away from the 90° contact angle.

In analogy therewith, the present invention provides a method for controlling an optical device comprising a container having an inner wall, said container enclosing a first liquid (A) and an electrically susceptible second liquid (B), said liquids (A; B) being immiscible and being in contact with each other via an interface (14), said interface having a contact angle with the inner wall an electrode arrangement (2; 12) for controlling the shape of the interface (14) by means of a voltage; the optical device having an operational range in between a first value of the contact angle and a second value of the contact angle, the first value being in a range of 50-110° and the second value being in a range of 70°-130°, the second value being larger than the first value, the method comprising the step of providing the electrode arrangement with a non-zero voltage during an idle state of the optical device to establish a contact angle in a range of 50-130° between the interface and the inner wall of the container.

According to another aspect of the present invention, there is provided an electronic device comprising an optical device as claimed in any of the claims 1-5; an image sensor oriented behind the optical device; and driver circuitry coupled between the image sensor and the electrode arrangement. Such an electronic device benefits from the higher switching speed of the optical device, which can be used to increase the operational frequency of the electronic device for those functions where the switching speed of the optical device is the rate-limiting step, such as autofocussing algorithms.

In an embodiment, the driver circuitry is arranged to provide the electrode arrangement with a non-zero voltage during the idle state of the optical device. This allows for a prior art optical device to benefit from the present invention as well.

Figure 2:
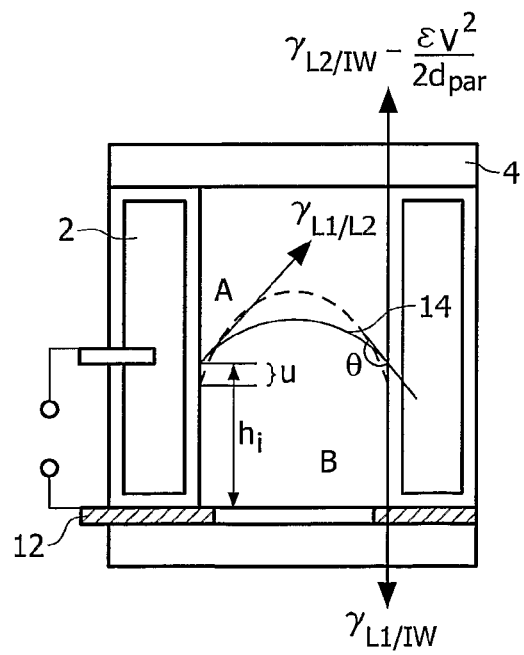
Figure 3:
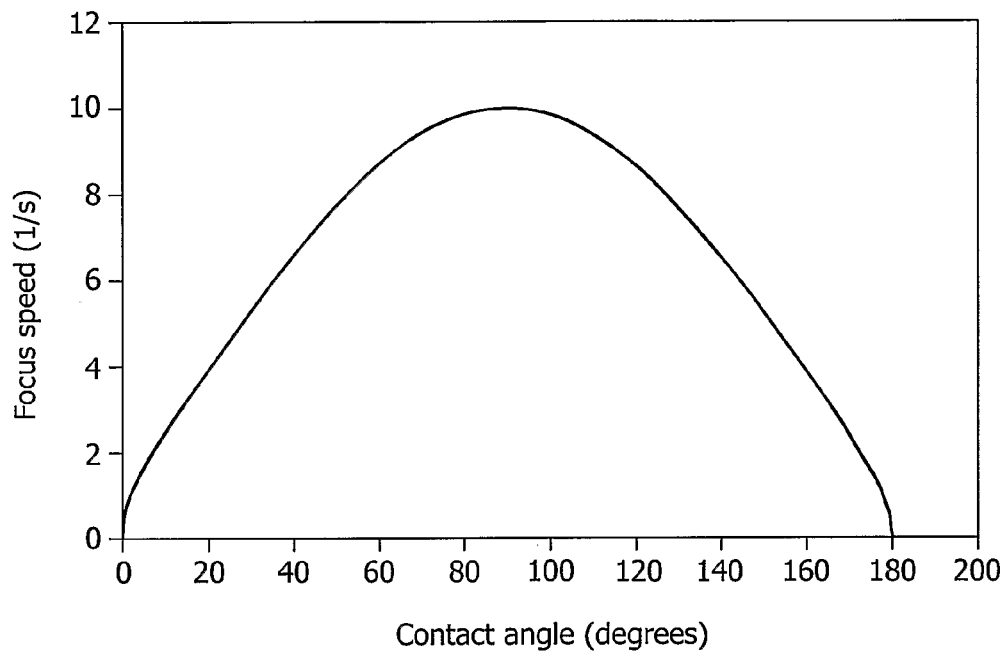
Figure 4:
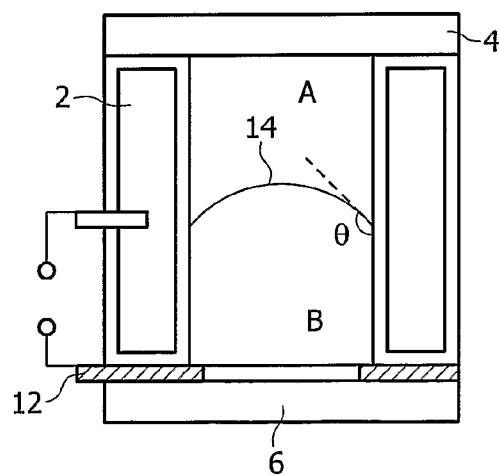
Figure 5:
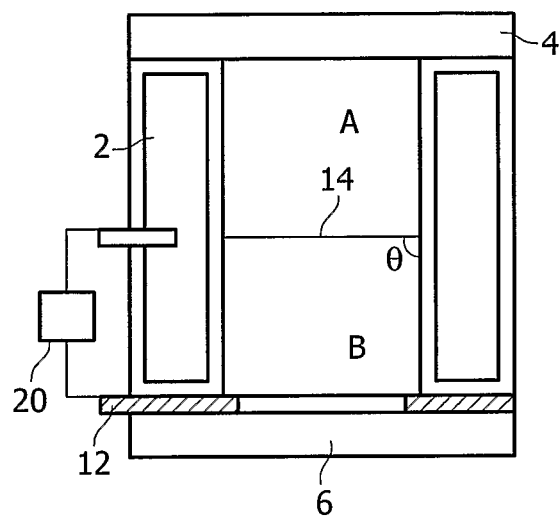
Figure 6:
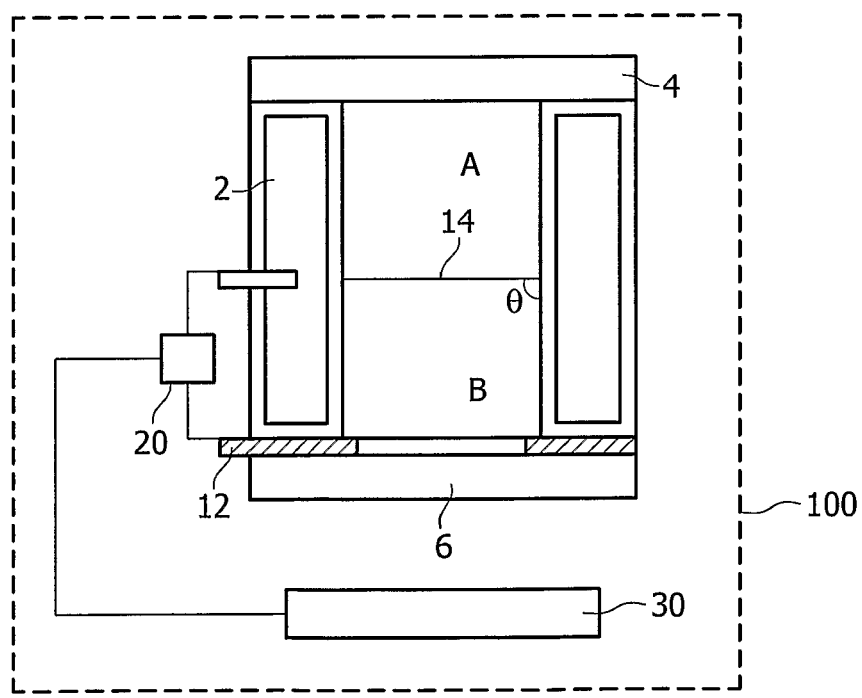

The invention is described in more detail and by way of non-limiting examples with reference to the accompanying drawings, wherein:

FIG. 1 schematically depicts a prior art variable focus lens;

FIG. 2 schematically depicts the forces operating on the interface of such an optical device;

FIG. 3 schematically depicts the response time as a function of the contact angle;

FIG. 4 schematically depicts an optical device according to the present invention;

FIG. 5 schematically depicts another optical device according to the present invention; and FIG. 6 schematically depicts an electronic device according to the present invention.

It should be understood that the Figures are merely schematic and are not drawn to scale. It should also be understood that the same reference numerals are used throughout the Figures to indicate the same or similar parts.

In FIG. 1, a variable focus lens as disclosed in International Patent application WO 03/069380 is shown. The variable focus lens comprises a first fluid A and a second fluid B housed in a cylindrical chamber. The fluids are immiscible, have different refractive indices and preferably have the same density to avoid orientation-dependent gravitational effects on the orientation of the fluids including the interface 14 between the fluids. The cylindrical chamber further comprises a first end portion 4 and a second end portion 6. The transparent end portions 4 and 6 may be a glass or polymer lid or another suitable transparent material, which may be lens-shaped.

The first end portion 4 as well as the inner walls of the cylindrical chamber are covered by a hydrophobic coating such as AF1600™ from the DuPont company, which may be combined with a parylene stack, to confine the conductive fluid B by the insulating fluid A in the absence of an applied voltage. The shape of the interface 14 can be switched in a continuous fashion from a convex shape shown in orientation (a) to a concave shape shown in orientation (b) by varying a voltage from a value V1 to a value V2 across the cylindrical electrode 2 embedded in the chamber wall and a, preferably transparent, annular electrode 12 on the second lid 6 which is in conductive contact with, or capacitively coupled to, the second fluid B. Consequently, the focal point of the light path L through the cylinder is altered.

In the absence of a voltage applied to the electrode arrangement 2, 12, the actual contact angle θ is determined by the forces as expressed in formula (1). Typically, the coating on the inner wall of the container of an optical device, such as the above described prior art variable focus lens, is chosen to have a strong dewetting interaction with the second liquid B. Consequently, the contact angle θ between the interface 14 and the inner wall of the container approaches 180° in an idle state of such an optical device.

However, the present invention is based on the recognition that the response time of the interface to a change in position can be expressed as a function of this contact angle. FIG. 2 schematically shows the forces that act upon the edge of the interface 14. This yields the following resulting force $F(\theta)$:

$$F(\theta) = \left(\gamma_{L2/IW} - \frac{\varepsilon V^2}{2d_{par}} - \gamma_{L1/IW} + \gamma_{L1/L2}\cos\theta\right)\pi d \qquad (2)$$

with $\varepsilon$ being the dielectric constant of the insulating coating on the inner wall, $d_{par}$ being the thickness of this coating, and d the meniscus diameter measured at the contact line with the wall.

Differentiation of $F(\theta)$ to θ yields the following expression:

$$\frac{\partial F(\theta)}{\partial \theta} = -\pi d \gamma_{L1/L2} \sin\theta \qquad (3)$$

By conversion of θ to u with u being the vertical deviation of the edge of the interface 14, that is, the vertical displacement of the contact point of the interface 14 with the inner wall caused by a positional change of the interface 14, as shown in FIG. 2, the following relation can be used:

$$\frac{\partial F}{\partial \theta} = \frac{\partial F}{\partial u}\frac{\partial u}{\partial \theta} \qquad (4)$$

and a spring constant K for the forces working on the interface 14 can be derived:

$$K = -\frac{\partial F}{\partial u} = \frac{\partial F}{\partial \theta}\left(\frac{\partial u}{\partial \theta}\right)^{-1} = -\pi d \gamma_{L1/L2}\sin\theta\left(\frac{\partial u}{\partial \theta}\right)^{-1} \qquad (5)$$

It has also be found that the contact angle θ is dependent on the interface height $h_i$ of the optical device, that is, the distance between the contact point of the interface 14 with the inner wall of the container and the bottom of the container:

$$h_i = \frac{1}{3}d\left(1 + \left(\frac{\frac{1}{2}\sin^3\theta - \frac{3}{2}\sin\theta + 1}{\cos^3\theta}\right)\right) \qquad (6)$$

Since $h_i - u = \text{constant}$, the following expression is obtained:

$$\frac{\partial u}{\partial \theta} = \frac{\partial h_i}{\partial \theta} = \frac{-1}{2(\sin\theta + 1)^2} \qquad (7)$$

Insertion of expression (7) into expression (5) yields:

$$K = 2\pi \gamma_{L1/L2} \sin\theta(\sin\theta + 1)^2 \qquad (8)$$

which demonstrates that the largest spring constant K corresponding to the fastest response time of the interface 14 the contact angle θ is achieved at a contact angle θ=90°. In case of critical damping, K relates to the response time τ according to the well-known mass-spring equation:

$$\tau \propto \sqrt{\frac{m}{K}} \quad (9)$$

where m is the effective mass of the liquids.

Equation (9) shows that a larger spring constant leads to a shorter response time. Moreover, a contact angle that is much larger than 90 degrees leads to a relatively small 'channel' of the first liquid A being trapped between second liquid B and the inner wall of the container. During a positional change of the interface from such an orientation, the first liquid A experiences a relatively large amount of friction in this 'channel', thus delaying the response of the interface to the positional change even further.

It is emphasized that these expressions are also valid for non-cylindrical containers such as a conically shaped container.

In FIG. 3, the dependency of the response speed, that is, the focussing speed, of the interface 14 of the optical device being a liquid-based variable focus lens is depicted as a function of the contact angle θ. To ensure a response speed of at least 75% of the maximum value, the operational range of the optical device should be chosen inside an interval of 50-130°. Obviously, the optical properties of the first liquid A and/or the second liquid B have to be chosen such that the desired optical function of the optical device can be performed within this range. For instance, for a liquid-based variable focus lens, the refractive indices of these liquids have to chosen such that the desired focal range of the optical device can be achieved with contact angles θ lying inside said range.

The operational range of the optical device does not have to cover the whole interval of 50-130°; much smaller intervals can be chosen, such as an interval from 80-100°, which is large enough to allow a liquid-based variable focus lens to have a focal range from say 2 cm to infinity. This interval has the advantage that for all values of the contact angle θ the response speed of the interface 14 is at least 90% of its maximum value, as shown in FIG. 3. The operational range is preferably centered around a value of 90° for the contact angle θ, but this is not necessary. For instance, an operational range of 100-120° or an operational range of 60-80° does not achieve the maximum response speed of the interface 14, but for all contact angle values in these ranges the response speed is still at least 80% of the maximum value, which still is good enough for many application domains of such an optical device.

FIG. 4 shows an embodiment of an optical device according to the present invention, in which the recognition of expressions 1 and 8 is utilized to obtain an optical device with a fast response time. A contact angle θ of around 120° is achieved by choosing a combination of perfluorononane for liquid A, an aqueous solution of sodium polytungstate for liquid B and a polyethylene coating on the inner wall of the container. Alternatives can be easily thought of by a person skilled in the art; for instance, a surface tension reducing compound such as trifluoroethane or sodium trifluoroacetate can be dissolved in water as an embodiment of a liquid B, which in combination with a teflon coating such as AF1600 from the DuPont company on the inner wall of the container also can lead to a contact angle θ inside the desired range of the present invention.

FIG. 5 shows another optical device of the present invention. The optical device has driver circuitry 20 coupled to the electrode arrangement comprising a cylindrical electrode 2 and the preferably annular electrode 12. The driver circuitry 20 is programmed to provide the electrode arrangement with a non-zero voltage when the optical device is in an idle state, i.e., when its optical function is not being utilized or is about to be used. This ensures that the first response time of the optical device after its activation is also fast. The non-zero voltage value can be obtained by experiment. Alternatively, the value can be calculated, because the contact angle θ is given by the following expression:

$$\cos\theta = \cos\theta_0 + \frac{1}{2}\frac{\varepsilon}{\gamma_{L1/L2}d}V^2 \quad (10)$$

with V being the applied voltage. This embodiment has the advantage that prior art liquid-based optical devices, such as the variable focus lens shown in FIG. 1 and described in the detailed description thereof, can be improved by adding a driver circuitry 20 that provides a suitable non-zero voltage during the idle state of the optical device, that is, a voltage forcing the contact angle θ in a range between 50°-130°. Obviously, the optical properties of the first liquid A and/or the second liquid B have to be chosen such that the desired optical function of the optical function lies within this range. For instance, for a liquid-based variable focus lens, the refractive indices of these liquids have to chosen such that the desired focal range of the optical device can be achieved with contact angles θ lying inside said range.

FIG. 5 shows an electronic device 100 of the present invention. The electronic device 100 includes an optical device of the present invention and an image sensor 30 placed behind the optical device to record an image that has been captured by the optical device. This image can be anything from a readout bit captured by an optical storage device or a megapixel image captured by a digital still camera or a mobile phone including camera functionality.

The driver circuitry 20, which may be an integral part of the optical device or may be a part of the electronic device 100, is coupled between the image sensor 30 and the electrode arrangement of the optical device. Due to the fact that the response time of the optical device is optimized, the electronic device 100 of the present invention has an improved performance for functions including the optical device, such as the implementation of an autofocus algorithm involving the image sensor 30 generating an error signal and the driver circuitry 20 being responsive to such an error signal.

It is emphasized that in the context of the present invention, the phrase optical device is not intended to limit the application domain of the devices of the present invention to the visible part of the electromagnetic spectrum. The invention can also be used for other parts of this spectrum, e.g., acoustic devices, without departing from the scope of the present invention.

It is also emphasized that the phrase electrically susceptible liquid is intended to include all liquids which behavior can be manipulated by a force resulting from the application of an electric current or an electric field, such as polar liquids and polarizable liquids.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical device having an optical function and an operational range, said optical device comprising:
    a container having an inner wall, said container enclosing a first liquid and an electrically susceptible second liquid, said liquids being immiscible and being in contact with each other via an interface, said interface having a contact angle with the inner wall: and
    an electrode arrangement for controlling the shape of the interface by means of a voltage:
    the optical device being configured such that said operational range during utilization of said optical function is defined, and confined. betxveen a first value of the contact angle and a second value of the contact angle, the first value being in a range of 50-110° and the second value being in a range of 70°-130°,the second value being larger than the first value, at least one of the first liquid and the second liquid comprising a surface tension reducing compound.

2. An optical device as claimed in claim 1 wherein the surface tension reducing compound is a fluorinated organic compound.

3. An optical device having an optical function and an operational range, said optical device comprising:
    a container having an inner wall, said container enclosing a first liquid and an electrically susceptible second liquid, said liquids being immiscible and being in contact with each other via an interface, said interface having a contact angle with the inner wall: and
    an electrode arrangement for controlling the shape of the interface by means of a voltage;
    the optical device being configured such that said operational range during utilization of said optical function is defined, and confined, between a first value of the contact angle and a second value of the contact angle, the first value being in a range of 50-110° and the second value being in a range of 70°-130°,the second value being larger than the first value, said optical device further comprising driving circuitry coupled to the electrode arrangement for providing the electrode arrangement with a non-zero voltage during an idle state of the optical device.

4. The optical device of claim 3 wherein the operational range is centered around 90°.

5. An electronic device comprising:
    an optical device as claimed in claim 3;
    an image sensor oriented behind the optical device; and
    driver circuitry coupled between the image sensor and the electrode Arrangement.

6. An electronic device (100) as claimed in claim 5, wherein the driver circuitry (20) is arranged to provide the electrode arrangement (2; 12) with a non-zero voltage during an idle state of the optical device.

7. A dual-layer optical recording system comprising the electronic device as claimed in claim 5.

8. The optical device of claim 3, wherein respective optical properties of said liquids allow said operational range to afford utilization of said optical function of the optical device.

9. The optical device ofclaim 8, wherein said optical properties comprise respective refractive indices of said liquids.

10. The optical device of claim 3, wherein the inner wall of the container is oriented with an optical axis of the optical device.

11. The optical device of claim 3, wherein said voltage is applied to utilize said optical function of the optical device by switching the contact angle between the first and second values.

12. A method comprising the acts of:
    providing said optical device of claim 3; and
    operating said optical device within said operational range to utilize said optical function.

13. A method for controlling an optical device comprising a container having an inner wall oriented with an optical axis of the optical device, said container enclosing a first liquid (A) and an electrically susceptible second liquid (B), said liquids (A; B) being immiscible and being in contact with each other via an interface (14), said interface (14) having a contact angle with the inner wall; and an electrode arrangement (2; 12) for controlling the shape of the interface (14) by means of a voltage; the optical device having an operational range in between a first value of the contact angle and a second value of the contact angle, the first value being in a range of 50-110° and the second value being in a range of 70°-130°,the second value being larger than the first value;
    the method comprising the step of providing the electrode arrangement (2; 12) with a non-zero voltage during an idle state of the optical device to establish a contact angle ($\theta$) in a range of 50-130° between the interface (14) and the inner wall of the container.

* * * * *